United States Patent
Panje

(10) Patent No.: US 11,323,415 B2
(45) Date of Patent: *May 3, 2022

(54) METHOD AND APPARATUS FOR PROVIDING OVER THE TOP STREAMING

(71) Applicant: ARRIS Enterprises LLC, Suwanee, GA (US)

(72) Inventor: Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/142,644

(22) Filed: Jan. 6, 2021

(65) Prior Publication Data

US 2021/0126898 A1    Apr. 29, 2021

Related U.S. Application Data

(63) Continuation of application No. 15/841,602, filed on Dec. 14, 2017, now Pat. No. 10,904,209.

(51) Int. Cl.
*H04L 29/12* (2006.01)
*H04H 20/82* (2008.01)
(Continued)

(52) U.S. Cl.
CPC ......... *H04L 61/2582* (2013.01); *H04H 20/82* (2013.01); *H04L 12/1886* (2013.01); *H04L 29/06027* (2013.01); *H04L 65/103* (2013.01); *H04L 65/4084* (2013.01); *H04L 65/602* (2013.01); *H04L 67/02* (2013.01); *H04L 67/20* (2013.01); *H04L 67/2823* (2013.01);
(Continued)

(58) Field of Classification Search
CPC ............. H04L 61/2582; H04L 12/1886; H04L 29/06027; H04L 65/103; H04L 65/4084; H04L 65/602; H04L 67/02; H04L 67/20; H04L 67/2823; H04L 67/2842; H04L 67/1002; H04L 2029/06054; H04H 20/82; H04N 21/2187; H04N 21/6125; H04N 21/222; H04N 21/43615; H04N 21/64322
See application file for complete search history.

(56) References Cited

U.S. PATENT DOCUMENTS

2007/0294622 A1* 12/2007 Sterner ................ G11B 27/105
715/716
2014/0165095 A1* 6/2014 Miller .............. H04N 21/44016
725/34
(Continued)

FOREIGN PATENT DOCUMENTS

WO        0184336 A1    11/2001

*Primary Examiner* — Kunal Langhnoja
(74) *Attorney, Agent, or Firm* — Buchanan, Ingersoll & Rooney PC

(57) ABSTRACT

Various implementations described herein are directed to technologies for providing over the top streaming for one or more clients of a network. A network is formed among the network among customer premises equipment. The customer premises equipment may include at least a gateway and the one or more clients. A user selection for over the top (OTT) content is received. The OTT content is received and includes one or more cue points. The gateway is marked as a proxy server in response to receiving the one or more cue points. Proxy data is received from the gateway corresponding to the one or more cue points.

20 Claims, 5 Drawing Sheets

(51) Int. Cl.
*H04L 12/18* (2006.01)
*H04N 21/2187* (2011.01)
*H04N 21/61* (2011.01)
*H04L 29/06* (2006.01)
*H04L 29/08* (2006.01)
*H04L 61/2582* (2022.01)
*H04L 65/1101* (2022.01)
*H04L 67/02* (2022.01)
*H04L 67/565* (2022.01)
*H04L 67/568* (2022.01)
*H04L 65/60* (2022.01)
*H04L 65/1023* (2022.01)
*H04L 67/53* (2022.01)
*H04L 65/612* (2022.01)
*H04L 67/1001* (2022.01)

(52) U.S. Cl.
CPC ..... *H04L 67/2842* (2013.01); *H04N 21/2187* (2013.01); *H04N 21/6125* (2013.01); *H04L 67/1002* (2013.01); *H04L 2029/06054* (2013.01)

(56) References Cited

U.S. PATENT DOCUMENTS

2016/0073176 A1\* 3/2016 Phillips .............. H04N 21/2402
725/35
2017/0085950 A1\* 3/2017 Halepovic .......... H04N 21/2402

\* cited by examiner

METHOD AND APPARATUS FOR PROVIDING OVER THE TOP STREAMING

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

There are instances when an Internet Protocol (IP) client is an older device and/or runs an older software version. In these instances, the IP client may have less capability, may not be able to decode certain formats and/or may not be able to support newer methods of data packing. In addition, these older devices may not include a central processing unit (CPU) or resources capable of processing a stream delivered to the IP client through an over the top (OTT) server. The aforementioned resource constraints may be momentary or may persist for long periods of time. There are instances where the OTT server may push certain data to a client at certain times. The data may need certain conditioning as well as translation in cases where an IP client is MSO agnostic or is not capable of processing the data. The present disclosure addresses the above limitations.

SUMMARY

Described herein are implementations of various technologies of a method of providing over the top streaming for one or more clients of a network. A network is formed among the network among customer premises equipment. The customer premises equipment may include at least a gateway and the one or more clients. A user selection for over the top (OTT) content is received. The OTT content is received and includes one or more cue points. The gateway is marked as a proxy server in response to receiving the one or more cue points. Proxy data is received from the gateway corresponding to the one or more cue points.

When the one or more cue points include index data, the index data may be appended to a proxy server uniform resource locator as a variable. In one implementation, the index can provide an indication to include a proxy server script. In another implementation, the index can provide an indication to use a different proxy port.

The one or more cue points can be inserted in the OTT content as metadata. The metadata can be delivered as out of band data and/or Internet Protocol data.

The one or more cue points may be inserted as a different PID. In one implementation the different PID includes a trigger. In another implementation, the different PID includes index data.

The one or more cue points may be inserted at one or more predetermined times. The one or more predetermined times may include commercial breaks, promotional opportunities, when a credit goes above or below a threshold and/or a subscription transition time.

In one implementation, the proxy data may include pre-installed content. In another implementation, the proxy data may include translated content. In yet another implementation, the proxy data may include an alert.

Also described herein are implementations of various technologies of a device for providing over the top streaming. The device includes a set top box. The set top box may be configured to: form a network among customer premises equipment, the customer premises equipment including at least a gateway and the set top box; receive a user selection for OTT content; receive OTT content, the OTT content including one or more cue points; mark the gateway as a proxy server in response to receiving the one or more cue points; and receive proxy data from the gateway corresponding to the one or more cue points.

Further described herein are implementations of various technologies of a non-transitory computer-readable medium having stored thereon a plurality of computer-executable instructions which, when executed by a computer, cause the computer to: form a network among customer premises equipment, the customer premises equipment including at least a gateway and one or more clients; receive a user selection for OTT content; receive OTT content, the OTT content including one or more cue points; mark the gateway as a proxy server in response to receiving the one or more cue points; and receive proxy data from the gateway corresponding to the one or more cue points.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

One or more implementations of various techniques for providing over the top streaming will now be described in more detail with reference to FIGS. 1-5 in the following paragraphs.

Figure 1:
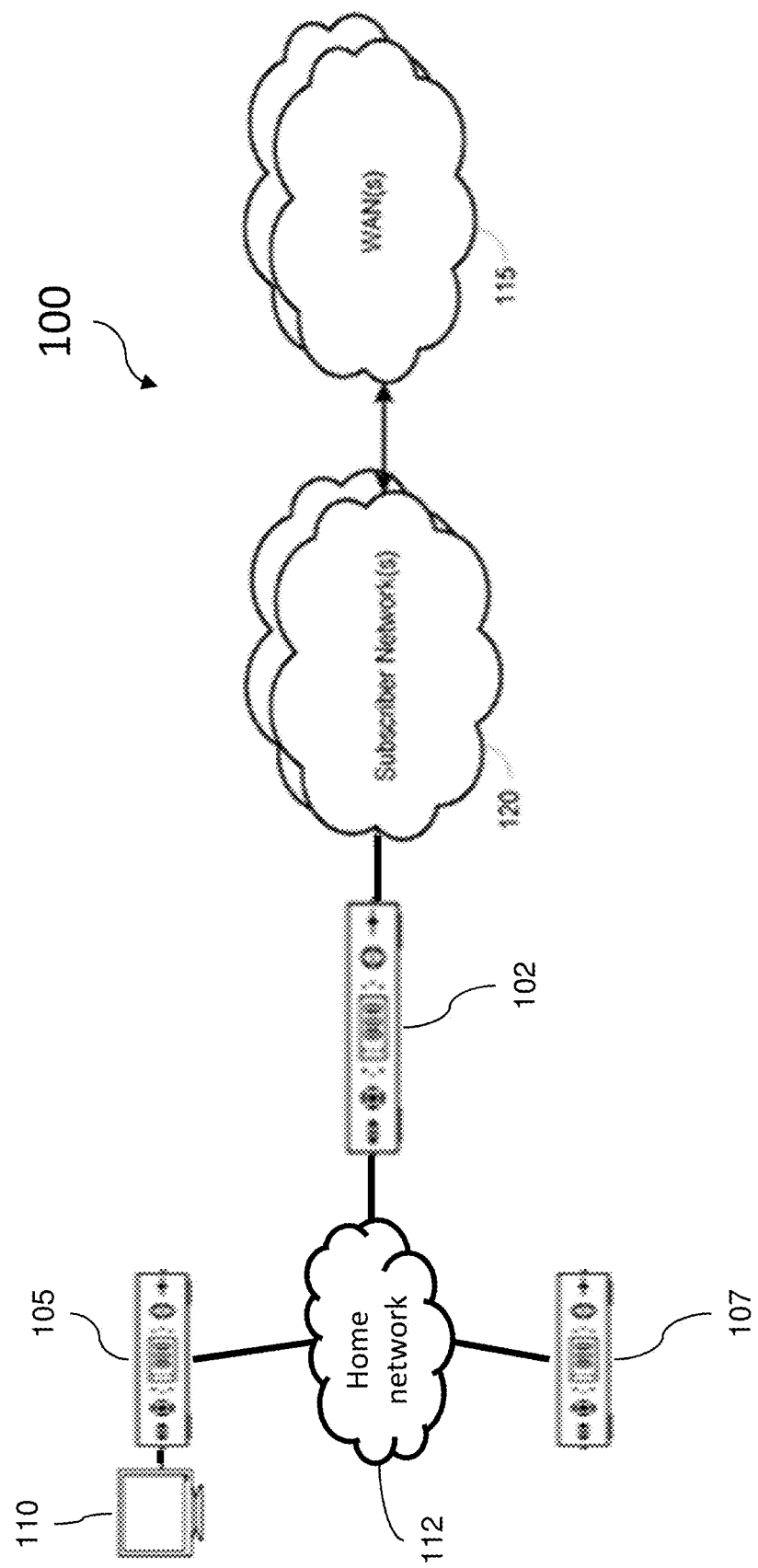
FIG. 1 illustrates an example network environment in accordance with implementations of various techniques described herein.

FIG. 1 is a block diagram illustrating an example network environment 100 for providing over the top streaming for at least one client of a home network. In some implementations, video, voice, and/or data services may be delivered to one or more client devices via one or more customer premise equipment (CPE) devices installed within a subscriber premise. The CPE devices may include, for example, a home network 112 that includes a gateway 102 and one or more set-top boxes or mobile devices 105, 107. The CPE devices may include mobile devices or smart phones with display which are provisioned by the MSO for the user. For example, multiple services may be provided by a set-top box (STB) 105, 107 and may be received by a user through a display device (e.g., television 110). It should be understood that a user may receive multiple services through other display devices such as a mobile device, tablet, computer, gaming console, and others. The various data, multimedia, and/or voice services provided by the STB 105, 107 may include, but is not limited to, live or broadcast television, video-on-demand (VoD) content, pay-per view content, recorded content (e.g., DVR content), audio-only content, streaming content, and others. A set-top box (STB) may receive content from multiple different networks and/or service providers and store this content in a memory. In one implementation, STB 105, 107 may act as a digital media server in a DLNA-based network. In one implementation, STB 105, 107 can be a digital video recorder (DVR) or any other multimedia device capable of providing DVR-like functionality.

Multiple services may be delivered to CPE devices over one or more local networks. For example, a local network may be provided by a gateway device, e.g. gateway 102, and the multiple services may be delivered to one or more CPE devices by the gateway device. Local network(s) may include a coaxial network, a hypertext transfer protocol (HTTP) network, a local area network (LAN), wireless local area network (WLAN), personal area network (PAN), Multimedia over Coax Alliance (MoCA) network, mobile hotspot network, and others. It should be understood that the STB 105, 107 may receive services from and may output upstream communications to an access point (e.g., gateway device, modem, router, wireless extender, etc.) over a wired or wireless connection to the access point.

Multiple services may be delivered to a subscriber premise from a wide-area network (WAN) 115 through a subscriber network 120. The subscriber network 120 may include, for example, a hybrid fiber-coaxial (HFC) network, fiber network, mobile network, satellite network, and any other network operable to deliver services to a subscriber premise.

Multimedia content may be received at the STB 105, 107 as a content stream. For example, the content may be delivered to the STB 105, 107 as a stream of packets or frames, and the packets or frames may be decoded and processed for presentation to a user through a connected display device (e.g., television 110).

The STB 105, 107 may be configured to receive content from a plurality of content or service providers. For example, the STB 105, 107 may receive content from a plurality of different subscriber networks 120 (e.g., a head end of a cable network, satellite network, etc.) and/or WANs 115. Content streams received from different service providers may be received at the STB 105, 107 in different formats.

Figure 2:
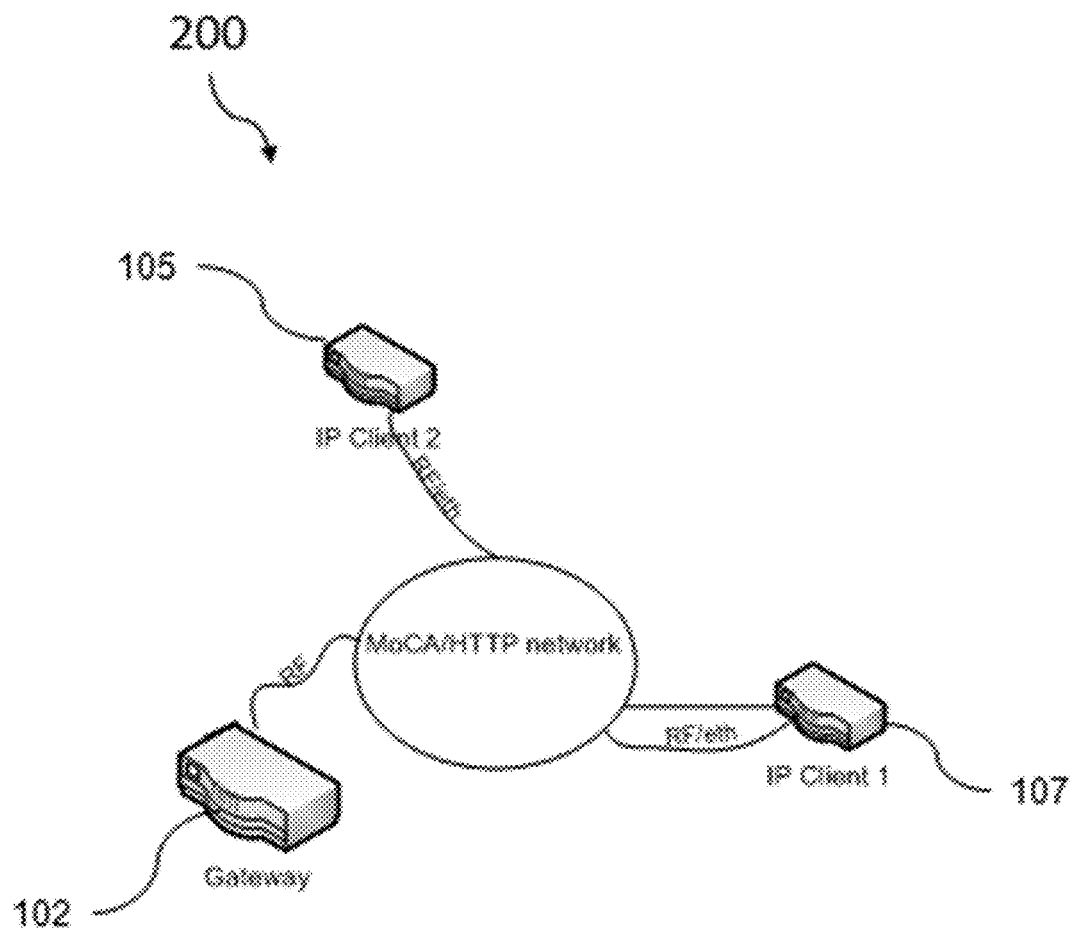
FIG. 2 illustrates an example home network in accordance with implementations of various techniques described herein.

FIG. 2 is a block diagram illustrating a home network 200 in accordance with various implementations described herein. The home network 200, e.g., a MoCA and/or HTTP network, may include a gateway 102 and at least one IP client 105, 107. In this example, the gateway 102 and the at least one IP client 105, 107 are operable to provide OTT streaming in accordance with various implementations described herein. Gateway 102 may receive content from an outside network, e.g., subscriber network 120, and proxy the content to IP clients having resource and/or capability constraints. In one implementation, a server (not shown), e.g., a multiple system operator (MSO) server, of the subscriber network 120 may send content offline to the gateway 102. In one implementation, the at least one IP client 105, 107 may receive data from gateway 102 operating as a proxy within the home. In another implementation, the IP client 105, 107 may receive data from an OTT server directly.

The gateway 102 and/or IP client 105, 107 may receive OTT or IP data from an in-home DLNA server or an OTT server. In one implementation, data to the IP client 105, 107 may be delivered as plain HTTP data. The OTT server may be a MSO server or a general server.

The gateway 102 may be configured, e.g., by a MSO server of the subscriber network 120 to include business related content insertion and conditioning data. For example, a different advertisement may be included within a targeted advertisement window or a purchase banner, e.g., for pay per view (PPV) provided to the display device 110. Another example of business related content insertion and conditioning data may include providing different encoding and/or decoding data. The above data is intended for the IP client, and the gateway decodes/encodes the data as per the IP client capability.

The gateway 102 may also be configured to alleviate capability and/or resource issues in a dynamic manner, without requiring any changes in the processing method for the data. For example, the gateway can buffer certain data for the IP client, decode an unsupported format, provide images, etc.

Advertisement or business logic, e.g., a purchase banner, may be applied to content at certain times. In one implementation, the GW is configured to stitch or insert items into the content at certain intervals.

In one implementation, when a user selects and plays OTT content, e.g., from a MSO OTT server of subscriber network 120, a portal of the MSO OTT server marks certain content portions to be "proxied" by the in-home gateway 102. The MSO OTT server may push some content (such as a targeted advertisement (TAD), a PPV banner, etc.) to gateway 102 a priori, e.g., after or before the IP client 105,107 selects OTT content to play. The MSO OTT content server inserts proxy cue points. Proxy cue points are markers to the proxied content portions. These proxy cue points maybe inserted either as metadata or as a different packet identifier (PID). When the IP client 105, 107 encounters these proxy cue points, the IP client 105, 107 marks the gateway 102 IP address as a proxy server IP address. The presence of the cues are interpreted by the IP client as a command to use the gateway as proxy. The cues may also contain other index variables, which can be used by the IP client while forming the proxy URL. The gateway proxy server can act as proxy for content URL requests by the client. Non-content URL requests are not proxied by the gateway proxy server. Once the gateway 102 is marked as a proxy server, HTTP requests pass through the gateway. The gateway 102 can respond with pre-installed content or translated content. The gateway 102 can also provide PPV alerts or other messages as per business need. When the proxy cue point is removed, the IP client 105, 107 removes the proxy rerouting to the gateway 102. The MSO OTT content server determines if the cue is valid or not for a client with respect to the content. When or if a cue is not relevant, then the cues are removed from the content.

As the IP client is uniquely identifiable by the MSO OTT server, the server can individually manage the cues for an IP client.

The following describes an implementation of proxy cue points in network environment 100. A home network 112, 200 is formed between/among CPE devices 102, 105, 107. A user selects OTT content to play on an IP client 105, 107. An MSO OTT server of subscriber network 120 pushes some content, e.g., a TAD, a PPV banner, etc., to gateway 102 a priori. The content may be pushed to gateway 102 after or before the IP client 105, 107 selects OTT content to play.

The MSO OTT server inserts proxy cue points into the OTT content either as metadata or a different PID at certain predetermined times. The predetermined times may occur during commercial breaks, during a promotional opportunity, when a credit of a user goes above or below a threshold, and/or during a subscription transition time.

In one implementation, when the proxy cue point is inserted as metadata the proxy cue point is delivered as part of out of band data or IP data.

In another implementation, when the proxy cue point is part of different PID, i.e., within an inband transport stream, a dedicated PID may be used for the proxy cue point. The PID may include Null data (e.g., a trigger) or some other data such as an index to the data received and stored by the gateway 102 from the MSO OTT server. The cue point remains present in the stream as long as the MSO server indicates that the cue opportunity is active.

When the IP client 105,107 encounters the proxy cue points, the IP client marks the gateway 102 IP address as the proxy server IP address. Once the gateway 102 is marked as the proxy server, HTTP requests pass through the gateway 102. Once the gateway is marked as a proxy server, in one implementation all of the HTTP requests pass through the proxy server. In another implementation, the IP client only marks the gateway as proxy for OTT content requests.

In one implementation, if the cue point information has any index data, the index data can be appended to a proxy server uniform resource locator (URL) as a variable by the IP client 105, 107. In one implementation, the index may provide an indication to the IP client 105, 107 to include a proxy server script in the URL with the appended index data. In another implementation the index may provide an indication to the IP client 105, 107 to use a different proxy port.

When the gateway 102 receives the HTTP request, the gateway 102 can respond by sending pre-installed content or translated content to the IP client 105, 107. The gateway 102 can also provide PPV alerts or other messages to the IP client 105,107 in response to the HTTP request as per business need. In one implementation, the gateway proxy server responds with pre-installed or translated content only for HTTP requests for OTT content URL.

In one implementation, the preinstalled content may include MSO specific customized content where translation and/or customization can include merging video and other content, blending videos, and/or adding certain templates such as header and footer information. Translation may also include, interpreting a customer's current subscription status and providing an alert. For example, if a customer has a credit of $100, an alert may be provided to the customer that provides suggested content, e.g., an event that can be purchased for $50.

In another implementation, as stated above, when the proxy server URL includes index data, the IP client 105,107 can use this index data to either include a proxy server script in the proxy server URL with appended index data, e.g., variable, or use a different proxy port. The scripts can be different for different clients within a home. The gateway proxy can customize the content differently for different clients. The scripts can take different variables, which instruct the gateway server proxy to apply or provide different translation or content. Different ports and/or scripts can be used for the above purposes.

When the "proxy" cue point is removed, the IP client will remove the proxy, i.e., stop rerouting HTTP requests to the gateway 102. The MSO OTT content server determines if the cue is valid or not for a client with respect to the content. When or if a cue is not relevant, the cues are removed from the content.

Figure 3:
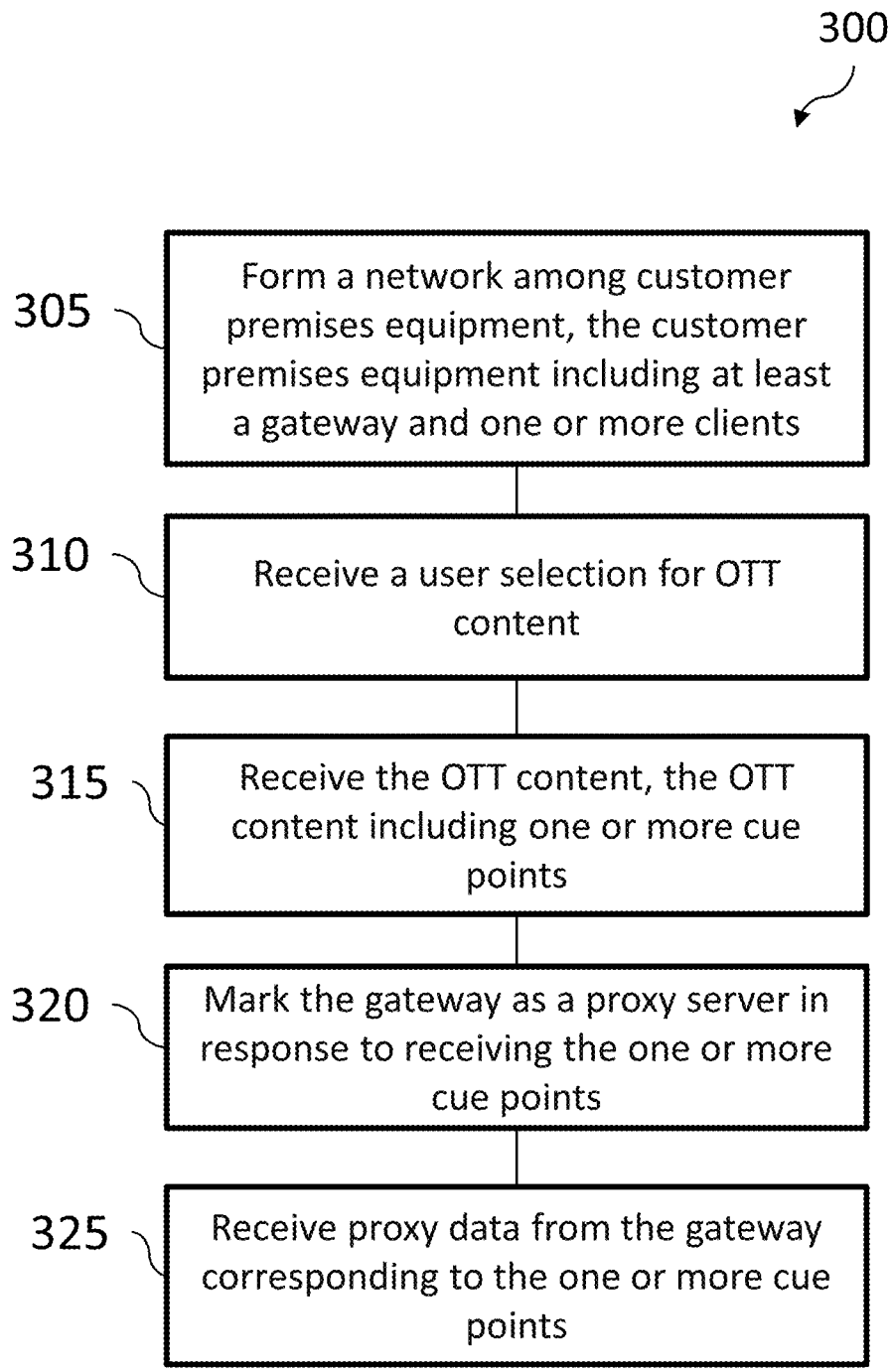
FIG. 3 illustrates a flow diagram of a method of providing over the top streaming for one or more clients of a network in accordance with implementations of various techniques described herein.

FIG. 3 illustrates a diagram of a method 300 for providing OTT streaming for one or more clients of a network in accordance with implementations of various techniques described herein. At block 305, the network is formed between/among customer premises equipment. The customer premises equipment includes at least a gateway and the one or more clients. At block 310, a user selection for OTT content is received by the one or more clients.

At block 315, the OTT content is received by the one or more clients. The OTT content may include one or more cue points. The cue points may be included in OTT content received by the one or more clients 105, 107 from a MSO OTT server of subscriber network 120.

At block 320, the gateway is marked as a proxy server in response to receiving the one or more cue points. Once the gateway is marked as a proxy server, HTTP requests, e.g., from IP client 105, 107, pass through the gateway 102.

At block 325, proxy data from the gateway corresponding to the one or more cue points is received. The proxy data from the gateway 102 may include pre-installed content, translated content, PPV alerts and/or other messages as per business need.

The one or more cue points may include index data. When the one or more cue points include index data, the index data can be appended to a proxy server uniform resource locator as a variable. In one implementation, the index provides an indication to include a proxy server script, in another implementation, the index provides an indication to use a different proxy port.

The one or more cue points may be inserted in the OTT content as metadata. The metadata may be delivered as out of band data or IP data.

The one or more cue points may be inserted in the OTT content as a different PID. The different PID may include a trigger or index data.

The one or more cue points may be inserted into the OTT content at one or more predetermined times. The one or more predetermined times may include commercial breaks, promotional opportunities, when a credit goes above or below a threshold and/or a subscription transition time.

Figure 4:
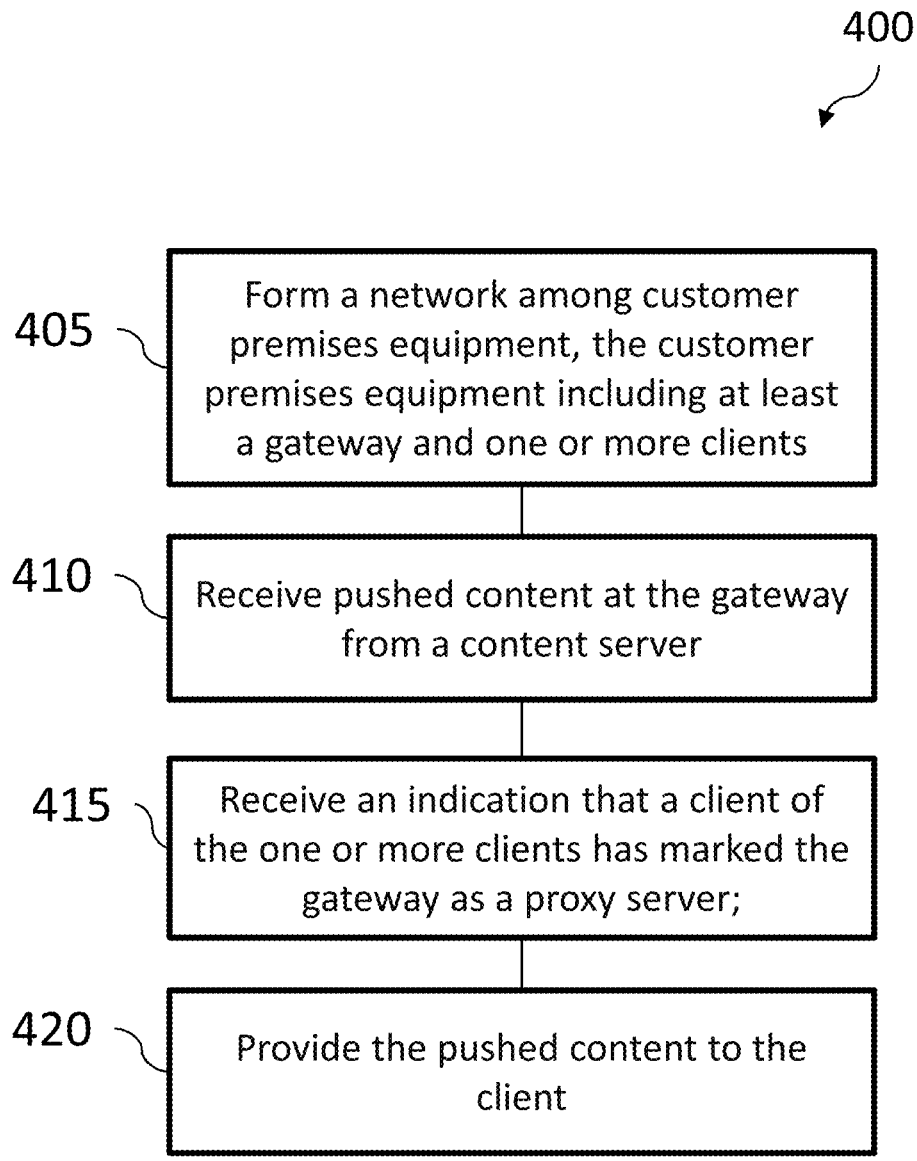
FIG. 4 illustrates a flow diagram of a method of providing over the top streaming at a gateway of a network in accordance with implementations of various techniques described herein.

FIG. 4 illustrates a diagram of a method 400 for providing over the top streaming at a gateway of a network. At block 405, the network is formed among customer premises equipment. The customer premises equipment may include at least the gateway, e.g., gateway 102, and one or more clients, e.g., IP client devices 105, 107.

At block 410, pushed content is received at the gateway from a content server. In one implementation, the content server may be a MSO OTT server. The pushed content may be received at the gateway before or after an OTT content selection is received by a client.

At block 415, an indication that a client of the one or more clients has marked the gateway as a proxy server is received. At block 420, the pushed content is provided to the client.

The pushed content, e.g., proxy data, may include pre-installed content, translated content and/or an alert.

Figure 5:
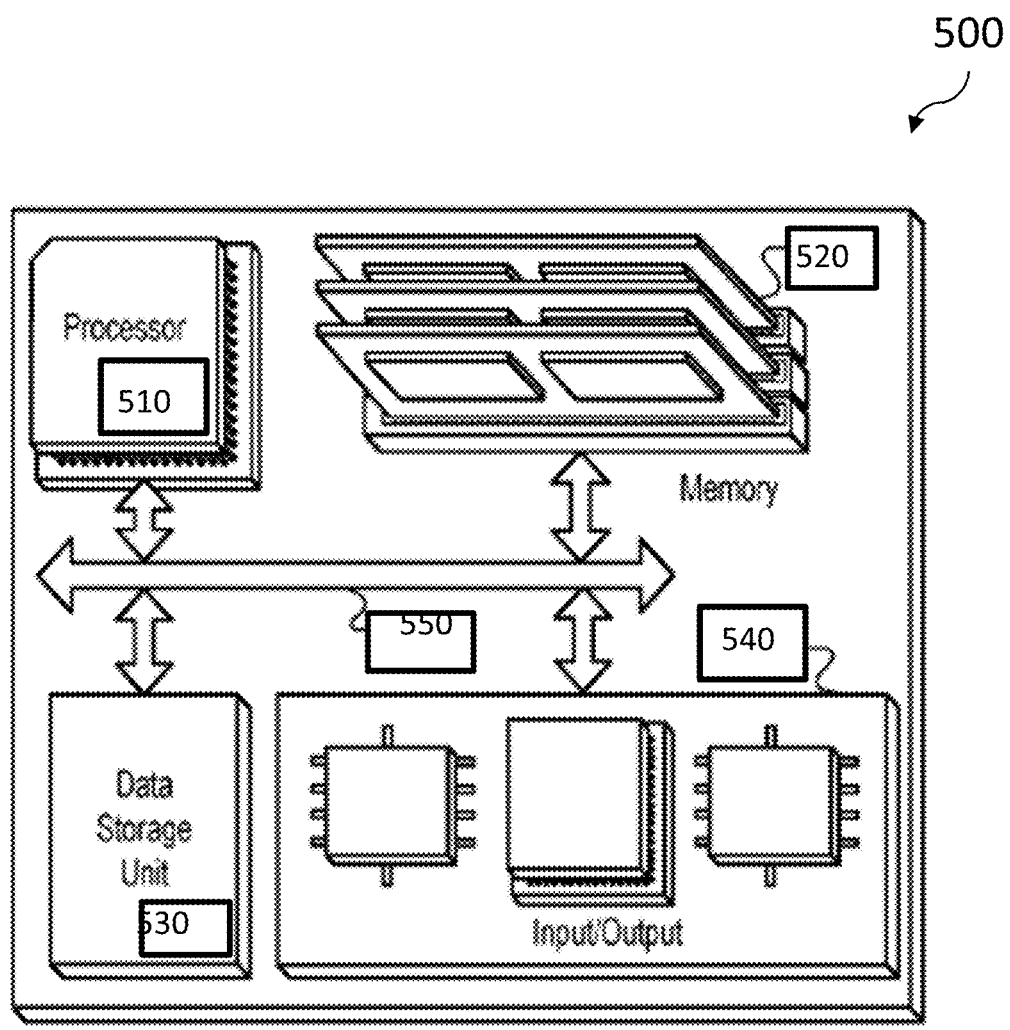
FIG. 5 illustrates a schematic diagram of a computing system in which the various technologies described herein may be incorporated and practiced.

FIG. 5 is a block diagram of a hardware configuration 500 operable to provide OTT streaming in a gateway or client device. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device/drive, an optical disk device, flash memory or some other large capacity storage device. In other implementations, the storage device 530 can be a device external to the hardware configuration 500.

The input/output device 540 provides input/output operations for the hardware configuration 500. in one implementation, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, and/or data services to a display device (e.g., television 110 of FIG. 1, mobile device, tablet, computer, etc.). In embodiments, the input/output device can include driver devices configured to send communications to, and receive communications from one or more networks (e.g., local network, subscriber network 120 of FIG. 1, WAN 115 of FIG. 1, etc.).

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of providing over the top (OTT) streaming for one or more clients of a network, comprising:
    configuring, by a cloud-based server, a gateway to include content insertion and conditioning data, said gateway being in communication with an IP client;
    inserting, by a portal of the cloud-based server, one or more proxy cue points in OTT content for distribution to the IP client, wherein the one or more proxy cue points are markers to proxied content portions indicating that certain content portions are to be proxied by the gateway;
    pushing, by the cloud-based server, the OTT content to the IP client, which interprets said one or more proxy cue points included in the OTT content as a command to use the gateway as a proxy, wherein only while the gateway is marked as the proxy, requests for OTT content, from the IP client, are passed through the gateway enabling the gateway to respond by sending proxy data corresponding to the one or more cue points;
    determining, by the cloud-based server, when the proxy cue points are no longer valid for the IP client; and
    upon determining that the proxy cue points are no longer valid for the IP client, removing, by the cloud-based server, the one or more proxy cue points from the OTT content.

2. The method of providing OTT streaming for one or more clients of a network, according to claim 1, wherein the cloud-based server is a multiple system operator (MSO) OTT server.

3. The method of providing OTT streaming for one or more clients of a network, according to claim 1, wherein the pushing of the OTT content, by the cloud-based server, to the IP client occurs before the IP client selects the OTT content.

4. The method of providing OTT streaming for one or more clients of a network, according to claim 1, wherein the pushing of the OTT content, by the cloud-based server, to the IP client occurs after the IP client selects the OTT content.

5. The method of providing OTT streaming for one or more clients of a network, according to claim 1, wherein the cloud-based server inserts the one or more proxy cue points in the OTT as metadata, which may be delivered as out of band data or IP data.

6. The method of providing OTT streaming for one or more clients of a network, according to claim 1, wherein the cloud-based server inserts the one or more proxy cue points in the OTT as a different packet identifier (PID).

7. The method of providing OTT streaming for one or more clients of a network, according to claim 6, wherein the different PID includes a trigger or index data.

8. The method of providing OTT streaming for one or more clients of a network, according to claim 1, wherein the cloud-based server inserts the one or more proxy cue points in the OTT at predetermined times.

9. The method of providing OTT streaming for one or more clients of a network, according to claim 8, wherein the predetermined times occur during a promotional opportunity, when a credit of a user goes above or below a threshold, and/or during a subscription transition time.

10. The method of providing OTT streaming for one or more clients of a network, according to claim 1, wherein the one or more proxy cue points include index variables, which are usable be used by the IP client for forming a proxy uniform resource locator (URL).

11. The method of providing OTT streaming for one or more clients of a network, according to claim 1, wherein if the one or more proxy cue points include index data, the index data is configured to be appended to a proxy server uniform resource locator (URL) as a variable by the IP client.

12. The method of providing OTT streaming for one or more clients of a network, according to claim 11, wherein the index data provides an indication to the IP client to include a proxy server script in the URL with the appended index data.

13. The method of providing OTT streaming for one or more clients of a network, according to claim 11, wherein the index data provides an indication to the IP client to use a different proxy port.

14. A network system for providing over the top (OTT) streaming for at least one client of a home network, said network system comprising:
    a cloud-based server;
    a gateway; and
    an IP client,
    wherein the cloud based server is configured to:
        configure the gateway to include content insertion and conditioning data,
        insert one or more proxy cue points in OTT content for distribution to the IP client, wherein the one or more proxy cue points are markers to proxied content portions indicating that certain content portions are to be proxied by the gateway;
        push the OTT content to the IP client, which interprets said one or more proxy cue points included in the OTT content as a command to use the gateway as a proxy;
        determine, when the proxy cue points are no longer valid for the IP client; and
        remove, upon determining that the proxy cue points are no longer valid for the IP client, the one or more proxy cue points from the OTT content,
    wherein the IP client is configured to pass requests for the OTT content through the gateway, enabling the gateway to respond by sending proxy data corresponding to the one or more proxy cue point, only while the gateway is marked as the proxy.

15. The network system for providing over the top (OTT) streaming for at least one client of a home network, according to claim 14, wherein the cloud-based server is a multiple system operator (MSO) OTT server.

16. The network system for providing over the top (OTT) streaming for at least one client of a home network, according to claim 14, wherein the cloud-based server pushes the OTT content to the IP client before the IP client selects the OTT content.

17. The network system for providing over the top (OTT) streaming for at least one client of a home network, according to claim 14, wherein the cloud-based server pushes the OTT content to the IP client after the IP client selects the OTT content.

18. The network system for providing over the top (OTT) streaming for at least one client of a home network, according to claim 14, wherein the cloud-based server inserts the one or more proxy cue points in the OTT (1) as metadata, which is deliverable as out of band data or IP data, or (2) as a different packet identifier (PID) including a trigger or index data.

19. The network system for providing over the top (OTT) streaming for at least one client of a home network, according to claim 14, wherein the cloud-based server inserts the one or more proxy cue points in the OTT at predetermined times.

20. The network system for providing over the top (OTT) streaming for at least one client of a home network, according to claim 19, wherein the predetermined times occur during a promotional opportunity, when a credit of a user goes above or below a threshold, and/or during a subscription transition time.

* * * * *